Nov. 15, 1949 G. E. KING ET AL 2,488,412
CONTROL SYSTEM
Filed Feb. 27, 1945 2 Sheets-Sheet 1
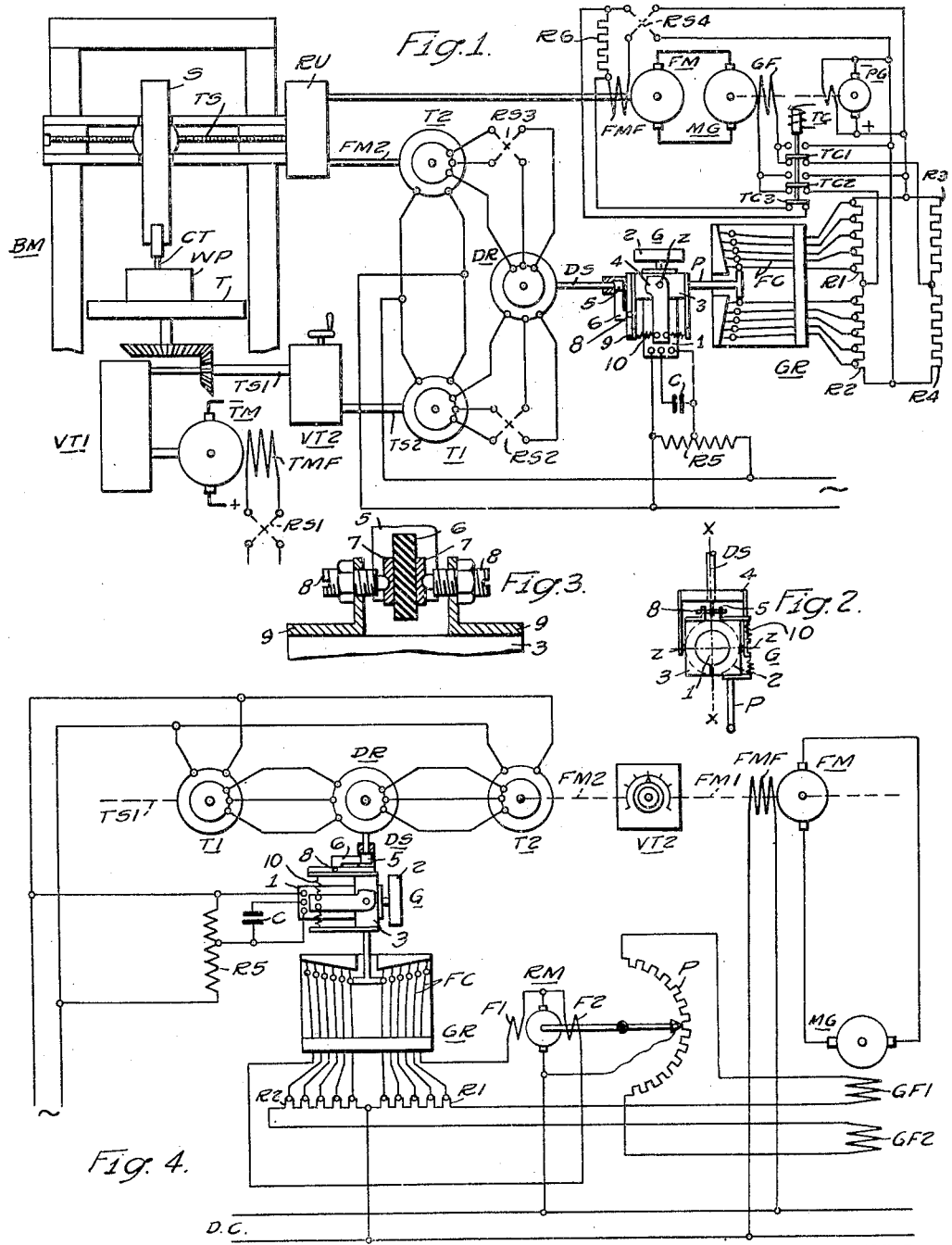
WITNESSES:
E. A. McCloskey
E. L. Oberheim
INVENTORS
George E. King, Nelson D. Cooper
and Glenn A. Caldwell.
BY
Paul E. Friedemann
ATTORNEY Nov. 15, 1949  G. E. KING ET AL  2,488,412
CONTROL SYSTEM
Filed Feb. 27, 1945  2 Sheets-Sheet 2

WITNESSES:
E. A. McClosky
E. F. Oberheim

INVENTORS
George E. King, Nelson D. Cooper
and Glenn A. Caldwell.
BY
Paul E. Friedemann
ATTORNEY Patented Nov. 15, 1949

2,488,412

UNITED STATES PATENT OFFICE 2,488,412

CONTROL SYSTEM

George E. King, Swissvale, Pa., Nelson D. Cooper, Mariemont, Ohio, and Glenn A. Caldwell, Pittsburgh, Pa., assignors to Westinghouse Electric Corporation, East Pittsburgh, Pa., a corporation of Pennsylvania Application February 27, 1945, Serial No. 580,040

12 Claims. (Cl. 318—77)

This invention relates, generally, to electric drives and, more particularly, to electric drives for positioning and driving in positional agreement an element to be controlled in accordance with a reference or controlling element.

More specifically, the invention relates to an electric follow-up drive or speed-matching drive which provides a positive power drive for a pair of elements and utilizes the difference in position and the rate of change of the difference of position of the pair of elements for controlling one of the elements in accordance with the movement of the other element.

In certain of its aspects, this invention is related to a copending application of George E. King, Serial No. 545,754, filed July 20, 1944, and entitled "Control systems," now United States Patent 2,389,368, issued November 20, 1945.

In certain other of its aspects, this invention is related to a copending application of C. R. Hanna and Edward R. Wolfert, Serial No. 481,190, filed March 31, 1943, and entitled "Position regulators" now Patent No. 2,419,210, issued Apr. 22, 1947.

The invention as hereinafter described and as illustrated in the accompanying drawings is adapted for machine tool control and particularly boring mill drives, that is, types of machine tools having moving work piece elements and moving cutting tool elements in which a variable ratio of speeds of the elements is desired, and any selected ratio of speeds is to be maintained constant. Such application, however, is shown by way of illustration and not limitation since many of the inventive features of this application are applicable to a wide variety of electric drives.

The average boring mill comprises a rotatable table upon which the work piece is secured and a moving saddle or support which operates along a track extending diametrically of the table and which carries the cutting tool ram. The movements of the saddle must be synchronized exactly with the movements of the table; otherwise, accurate machining operations on the work piece are not obtainable. On relatively small boring mills straight mechanical drives are usually satisfactory. However, as the machine size increases, the mechanical drives become increasingly cumbersome and complicated and, hence, undesirable. Electric drives for such machines offer a sensible and simple solution to the drive problem of the movable machine tool elements but introduce a new problem, namely that of properly synchronizing the movements of the separate driving motors for the machine tool elements. There are a number of methods by which the separate motors may be properly operated. One such method is disclosed in the electric drive of the copending application of George E. King, hereinbefore mentioned. The present invention relates to an equally desirable electric drive embodying another method of control.

One of the principal objects of this invention is to provide an electric drive for controlling an element in accordance with movements of a controlling element, which is simple in construction and effective in operation.

Another object of this invention is to provide an electric drive of the character mentioned which controls the element to be controlled in accordance with the difference in position of the controlled and controlling elements and the rate of change of such position difference.

Yet another object of this invention is to provide an electric drive of the character mentioned in which the ratio of the speeds of a pair of elements is variable over a wide range of values and which maintains any selected ratio of speeds of the elements closely constant.

A further object of this invention is to provide an electric drive of the character mentioned in which the controlled element is primarily controlled depending upon the speed of operation of the controlling element and which regulates the speed of the controlled element depending upon the difference in position and the rate of change of the difference in position of the controlling and controlled elements.

Other objects and advantages will become apparent from a study of the following disclosure when considered in conjunction with the accompanying drawings, in which:

Figure 1 schematically illustrates an electric drive applied to drive the moving elements of a machine tool which drive embodies the principles of this invention;

Fig. 2 is an end view of the gyroscope illustrated in Fig. 1;

Fig 3 is a detailed view of the friction damping assembly of the gyroscope;

Fig. 4 is a modification of the invention illustrated in Fig. 1;

Figure 5:
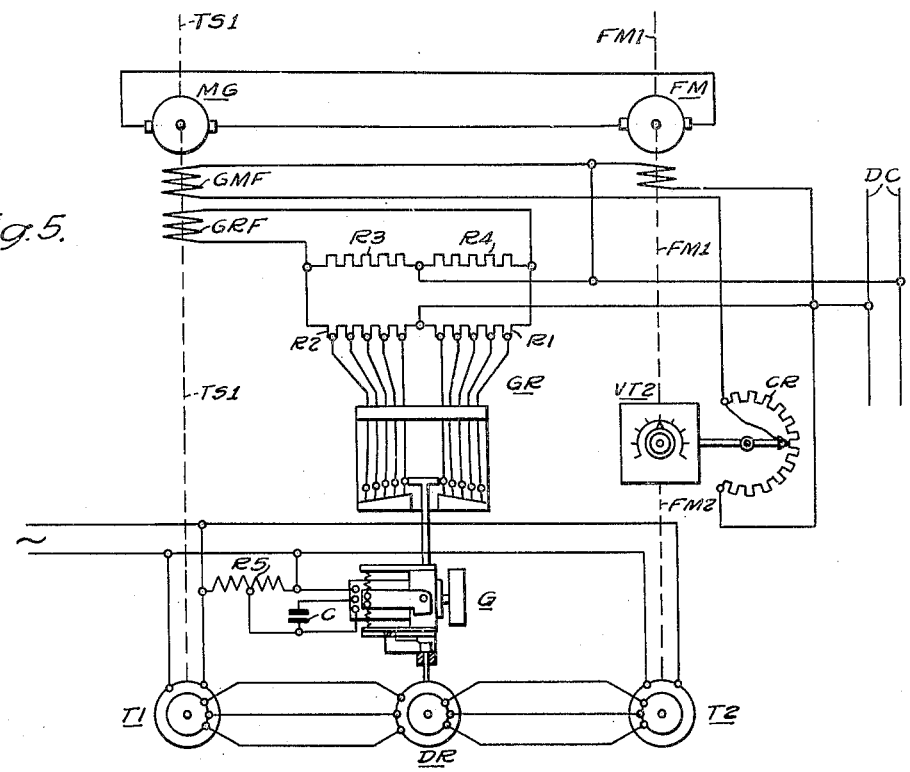
Fig. 5 is a modification of the invention embodying the more detailed principles of Fig. 4.

Broadly, the principle of operation of this invention is to provide a pair of quantities, one indicative of the movements of the controlling element, the other indicative of the movements of the element to be controlled, to differentially compare these quantities and utilize their difference as well as the rate of change of their difference for regulating the element to be controlled.

The basic principles, together with other more detailed principles, are embodied in Fig. 1 of the drawings. In this figure, a boring mill, generally designated BM, has its table T driven by a driving motor TM. This driving motor has its armature winding and field winding TMF energized by a suitable source of unidirectional current. Preferably, such a motor is a constant speed motor and drives the boring mill table through a variable ratio transmission VT1 which is selectively set over its variable speed range for any desired ratio of input to output speed. A work piece WP is shown secured to the table and a cutting tool CT is shown engaging the work piece. The cutting tool is fastened to the tool ram which operates vertically of the machine and which ram is, in turn, carried upon a saddle such as S which is operated by means of a rotatable threaded shaft disposed diametrically of the boring mill table. The threaded shaft TS is driven through a suitable gear reduction unit RU, generally indicated in block diagram, by a feed motor FM which controls the rate of movement of the cutting tool across the boring mill table. The motors TM and FM are mechanically independent; hence, some means must be provided for properly synchronizing the movements of the feed motor FM with those of the table motor TM to obtain the necessary constant feeding speed of the cutting tool with respect to the movements of the work piece. To this end, a synchrotie drive, including a pair of transmitting generators T1 and T2, which are respectively driven according to the movements of the table and the cutting tool saddle, is provided. The transmitter T1 is driven from the table shaft TS1 through a variable ratio transmission VT2 and thence through the shaft TS2 on the output side of the variable ratio transmission. The transmitter T2 is driven at any selected speed corresponding to the feed motor or cutting tool speed depending upon the ratio of the gear drive of the reduction unit RU. The electrical output of the two transmitters T1 and T2 is fed through the medium of suitable electrical connection including the reversing switches RS2 and RS3 into a differential receiver DR which moves according to the differential of the electrical output of the transmitters. Thus, when the electrical outputs of the transmitters T1 and T2 are identical in phase angle and in magnitude, the rotor element of the differential receiver does not move. However, should a difference in the electrical outputs of the transmitters occur, the rotor of the differential receiver will rotate in an amount indicative of the difference in angular positions of the rotor members of the transmitters and at a speed depending upon the difference in magnitudes of the separate generated quantities. Thus, a rotative movement is obtained at the rotor member of the differential receiver indicative of the amount of correction necessary to properly angularly position the rotor members and otherwise synchronize the operation of the motors TM and FM.

Since the motor FM is driving the load having the least mechanical inertia, the motor FM is selected as the motor to be regulated. Thus, the table motor TM may be termed the "reference element," and the feed motor FM, the "element to be controlled."

To this end, the motor FM has its armature connected in series circuit with the armature of a main generator MG. The generator MG may be driven by any suitable constant speed prime mover, for example, the table motor TM. Such driving connection for the generator MG has not been shown in the interest of simplicity since, per se, it forms no part of this invention. A pilot generator PG is shown mechanically connected to the generator MG and thus also is driven at a constant speed. The motor FM is provided with a single separately excited field winding FMF which is energized through a reversing switch RS4 by the pilot generator PG. The main generator MG is provided with a single control field winding GF which is energized according to the electrical output of the conventional Wheatstone bridge circuit embodying the resistor elements R1, R2, R3, and R4. This bridge circuit is energized by a suitable source of unidirectional current, such as the pilot generator PG, which may be, for example, also utilized to energize the field winding of the table motor. The resistors R1 and R2 have spaced tapped portions thereof connected to the extremities of the flexible conductors FC of a gyroscope regulator generally designated GR. The flexible conductors FC carry a plurality of contact elements at their free extremities and, as shown, are normally in disengaged position. These flexible conductors are deflected by means of a prod P which is connected to the gyroscope G to be moved according to the movements of the gyroscope about its Z and X axes. The arrangement is such that movements of the prod P shunt resistor portions of either of the resistors R1 and R2 alternatively depending upon the direction of angular movement of the gyroscope about the axes X and Z. Thus, the bridge circuit to which the gyroscope regulator is connected is electrically unbalanced and a current is caused to flow in the field winding GF of the generator MG indicative of the bridge unbalance. The gyroscope is driven about its X axis, which is the displacement axis, by means of the differential shaft DS connected to the rotor of the differential receiver.

In order to more clearly understand the exactness of the control of the feed motor FM which is obtained by means of the regulating control provided, an understanding of the gyroscope and its functions should be had. The gyroscope G comprises a motor housing 1 having enclosed therein a motor which drives the gyro wheel 2. As will be seen in Fig. 2, the gyro motor housing is securely clamped in a square block 3 which block, in turn, is pivotally carried between the extremities of the fork 4. The pivot points in the block 3 are so positioned that the gyroscope is statically balanced about the Z axis thereof, that is, the Z axis passes through the center of gravity of the gyroscope assembly. The fork member 4 is provided with a bearing in which the differential shaft DS, which is the output shaft of the differential receiver, is mounted for circumferential movement. This shaft terminates in a sleeve 5 which has an arm 6 extending radially therefrom. The arm 6 is disposed between a pair of friction shoes 7 adjustably carried at the extremities of the studs 8 which threadedly engage the angles 9 disposed in parallel relationship and secured to the square block 3 which carries or clamps the gyroscope about its motor housing. With this arrangement, it will be seen that any movement of the differential shaft DS causes the arm 6 connected thereto to bear against one or the other of the friction shoes, thus tending to carry the gyroscope angularly about the X axis thereof. As a result, the gyroscope tends to precess about its Z axis, and the velocity of the precessional movement is proportional to the rate of change of the angular movement of the shaft DS. The gyroscope is biased to its neutral position by means of a pair of tension springs 10, each secured at one extremity to an extension of the fork member 4 and their other extremities are rigidly secured with respect to the square block. As a result of these provisions, it will be seen that the prod P, which is disposed at a fixed radial distance from the X axis of the gyroscope and which has a fixed radial length with respect to the Z axis of the gyroscope, moves at its extremity in an amount depending upon the angular movement of the shaft DS and the rate of change of the angular movement of this shaft. Thus, the flexible conductors FC are deflected in this amount and the electrical resistance of either the resistors R1 or R2 is changed in an amount corresponding to the positional difference and the rate of change of the positional difference of the cutting tool saddle and the table of the boring mill. Precessional movements of the gyroscope are somewhat in excess of the actual indicated movement at the shaft DS, thus an electrical stimulus is provided of a value somewhat larger than that indicated. This tends to rapidly accelerate the motor to bring the machine tool elements into proper relationship. As the machine tool elements approach positional agreement, the movement of the gyroscope then becomes such as to rapidly remove the electrical stimulus, such that when positional agreement occurs, a reversed electrical stimulus is provided which prevents the feed motor from overshooting the position of equilibrium.

In order to prevent hunting of the gyroscope, the friction shoes thereof are provided. When the shaft DS is moved angularly and bears against one of the friction shoes to cause angular movement of the gyroscope about the X axis, a force in opposition to the applied force occurs as a result of the precessional movement of the gyroscope. This force is proportional to the precessional velocity of the gyroscope which velocity varies depending upon the rate of change of the applied force; thus, the counterforce varies in a like amount. As a result, the friction forces developed between the friction shoe and the arm 6 vary according to the precessional velocity of the gyroscope; thus, when the precessional velocity is high, a high friction force is obtained, and when the precessional velocity is low, a low friction force is obtained. This damps the movements of the gyroscope according to the needs and rapidly brings the gyroscope, once the applied force is removed, to its neutral position in a sinusoidal manner. Thus, overshooting of a condition of equilibrium is largely obviated.

The foregoing discussion has assumed a set operating speed of the cutting tool of the work piece at which the electrical output of the transmitters T1 and T2 is predetermined to be equal. Since in a boring mill drive the ratio of the cutting tool feeding speed and the table speed must be varied over a fairly wide range, a variable ratio transmission VT2 is provided in the drive of the transmitter T1. Alternatively, such a variable ratio transmission may be conveniently provided in the drive for the transmitter T2, as is shown in Fig. 4. When it is desired to change the rate of feeding speed for the cutting tool with respect to the table speed, the variable ratio transmission VT2 is set at some new value such that the ratio of its input and output speeds is changed. If the transmission is so adjusted that the shaft TS2 increases in speed, then the electrical output of the transmitter T1 will increase. As a result, an unbalance of the electrical outputs of the transmitters T1 and T2 occurs. The differential receiver immediately reflects this unbalance in electrical output in the movements of its rotor member and actuates the gyroscope about its X or deflection axis in a corresponding amount. The gyroscope then precesses and through the medium of the flexible conductors FC which changes the electrical resistance of one of the resistors R1 and R2, unbalances the bridge circuit in a direction to effect an increase in the excitation of the generator field winding GF such that the speed of the motor is increased to increase the feeding speed of the cutting tool. When a condition of electrical equilibrium of the transmitters T1 and T2 is reached, the precessional movement of the gyroscope ceases and the gyroscope is biased by means of the centering springs to its neutral position. The deflection of the flexible conductors is thus reduced to that indicated by the angular displacement of the gyro about its X axis and the system operates in equilibrium at this newly selected ratio of speeds until some external factor again necessitates a correction of the speed of the feed motor.

By including the reversing switch or contacts RS2 between the transmitter T1 and the differential receiver DR, it is possible to reverse the direction of the table without changing the direction of the feed. Also by including a reversing switch RS3 or contactor between the transmitter T2 and the differential receiver, it is possible to reverse the direction of the feed for a given rotation of the table. It is obvious that any suitable means may be provided responsive to the switch positions to indicate the direction of table movement and cutting tool movement. The switches RS2 and RS3 may be simultaneously operated by suitable electrical or mechanical linkage, or both, as desired. Similar considerations apply to the switches RS1 and RS4.

On a machine of this type, it is frequently desirable to have a traverse motion for the cutting tool that is several times faster than the maximum feeding speed. In the past, this has been accomplished by providing a separate motor having some fixed high speed providing a feeding speed on some boring mills quite often in the neighborhood of 10 feet per minute. With the arrangement herein disclosed, the entire speed range for feeding is obtained by means of variable voltage control of a single feed motor having a sufficiently high base speed. With such a motor drive, arrangements may be made for applying full voltage on the feed motor and then using a resistor in the motor field to obtain speeds approximately four times the base speed, which is ample for traversing. This is conveniently accomplished as shown by providing suitable contacting means such as the traversing contactor TC which disconnects the generator field GF from the electrical bridge circuit at the back contacts of the transfer contacts TC1 and TC2, and connects this field at the front contacts of TC1 and TC2 directly across the pilot generator PG to excite it at some predetermined high value. As a result, the motor armature is highly energized. The resistor R6 is now inserted by the contacts TC3 which, as the legend indicates, may be a part of the TC contactor or a separate contactor, as desired. Thus, the motor field is measurably weakened while at the same time the armature winding is highly energized. As a result, the motor speed is high to give a high traverse speed of the tool saddle and cutting tool.

The embodiment of the invention illustrated in Fig. 4 of the drawings involves the basic principles illustrated in Fig. 1. In this figure, parts similar to those illustrated in Fig. 1 are given like reference characters. In Fig. 1 of the drawings, the single generator field winding GF is energized according to the electrical output or unbalance of the bridge circuit; hence, the entire control of the generator depends upon the unbalance of the bridge. In some instances, particularly on the larger types of machine tools, the current requirements for exciting the field winding GF may be of such a magnitude that the relatively delicate flexible conductors of the gyroscope regulator may not be sufficiently large in cross-sectional dimension to carry the required currents. In such instances, separate control of the generator according to movements of the table is desirable. This is accomplished in Fig. 2 by providing the generator with two field windings GF1 and GF2 and connecting these field windings in adjacent legs of a bridge circuit which has for its other two adjacent legs the resistors R1 and R2 which are connected to the flexible conductors of the gyroscope regulator. A potentiometer, such as P, is connected between the field windings GF1 and GF2 and is provided with a slider operable along the length of the potentiometer by means of a regulating motor RM. This regulating motor is provided with a pair of field windings F1 and F2 which are arranged to be separately energized to effect reversing of rotation of the motor rotor. These field windings are alternately energized when the last contacting elements of the flexible conductors close. The bridge is energized from a suitable source of direct current, indicated at DC, having one terminal connected to the direct-current source between the resistors R1 and R2 and the resistor slider constituting the other terminal connected to the opposite side of the direct-current source. With this arrangement, when the system is started, the transmitter T1, by reason of its rotation according to the movements of the table, generates an electrical output which causes the differential receiver to rotate through a corresponding angle. Under such a condition, the rate of change in angular movement of the differential shaft DS of the differential receiver is fairly high and the gyroscope precesses substantially to its limits. This closes the last pair of contacts of the flexible conductors FC on the proper side of the regulator and energizes one of the field windings F1 or F2, thus effecting operation of the regulating motor to drive the resistor slider along the potentiometer. The bridge circuit with this arrangement is unbalanced at some fixed value depending upon the requirements of the feed motor to move into positional agreement with the table motor. Once positional agreement is approached, the regulating motor RM is brought to rest and the resistor slider maintained in the set position. Thus, the field windings GF1 and GF2 have a base excitation of an amount depending largely upon the speed of operation of the table motor, and the feed motor is operated at a speed and in a direction depending upon the unbalance of excitation and the direction of unbalance of the excitation of the generator fields GF1 and GF2. It then becomes the function of the gyroscope regulator to control only the necessary regulating currents for the field windings of the generator to maintain the selected ratio of speeds of the cutting tool and the table. If it is desired to change this ratio of speeds, the variable ratio transmission VT2 now disposed in the drive between the feed motor and the transmitter T2 is adjusted to some new value. Should it be so adjusted that the speed of the transmitter T2 is reduced in value, the gyroscope regulator and the regulating motor then function to further unbalance the excitation of the generator field windings GF1 and GF2. As a result, the speed of the feed motor is increased, and the speed of the feed of the cutting tool is increased until equilibrium of the electrical outputs of the transmitter T1 and T2 is again achieved. The gyroscope regulator will then function at this new operating speed of the feed motor to maintain the selected ratio of speeds.

Another method by which the principles set forth in connection with Fig. 4 may be practiced is illustrated in Fig. 5. Here the main generator MG which energizes the motor FM is driven by the shaft TS1 which, as shown in Fig. 1, is directly connected to the table. The shaft is thus operated according to the table speed. The output of the generator MG is, therefore, roughly proportional to the table speed, and the motor is energized accordingly. The main field winding GMF of the generator is energized from the source of direct current and has connected in series therewith a control rheostat CR which provides a range of current values for exciting the main field winding corresponding to the range of feeding speeds over which it is desired to operate the feed motor FM. A regulating field winding GRF is energized according to the electrical unbalance of the bridge circuit, which, in turn, is controlled by the gyroscope regulator. The control rheostat CR is provided with a slider which is mechanically driven from the variable speed transmission VT2. This mechanical arrangement is such that when the variable ratio transmission VT2 is set for a lower speed ratio, the resistor slider is moved to a position on the control rheostat where a larger portion of the rheostat is shunted from the generator main field circuit. Thus, as the ratio of the variable transmission VT2 approaches unity, the speed of the feed motor is increased by reason of the increased electrical output of the generator MG to bring the rotational speed of the rotor member of the transmitter T2 up to a value such that its electrical output is balanced against that of the transmitter T2. Should the ratio of the speeds to the shafts TS1 and FM1 depart from the value selected at the variable ratio transmission VT2, the differential receiver DR will angularly displace the gyroscope G about its displacement axis causing the gyroscope to precess. The resulting unbalance of the electrical bridge circuit which energizes the regulating field GRF is in such a direction and of such a magnitude as to rapidly restore the selected ratio of shaft speeds. Once this ratio is achieved, the function of the regulating field winding may cease, or it may add or subtract from the main excitation, depending upon the requirements. In any case, the current supplied to the feed motor by the generator MG results primarily if not entirely from the action of the main field winding GMF.

Figure 6:
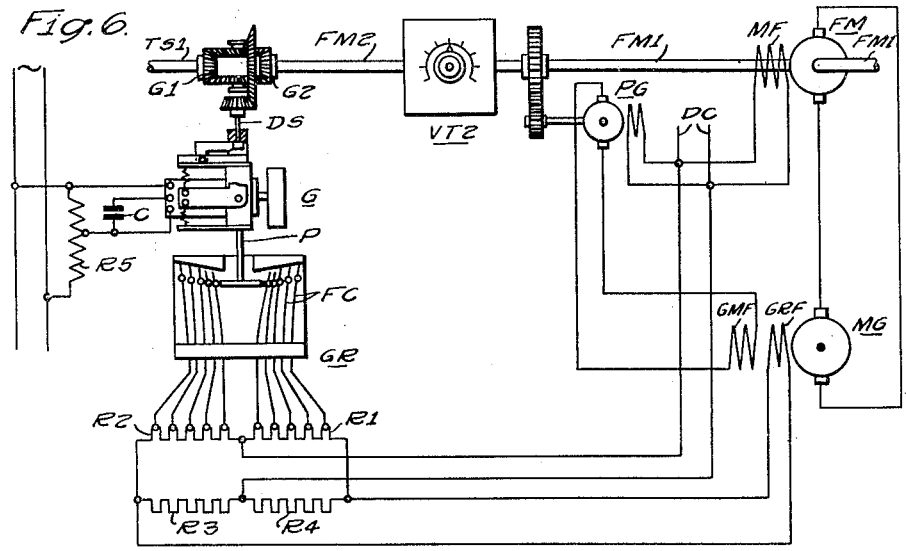
Fig. 6 is a still further modification of the invention illustrated in Fig. 4.

In Fig. 6 of the drawings, a mechanical differential is substituted for the electrical synchrotie of the preceding illustrations. It comprises the usual input gears G1 and G2 and a cage element carrying a pair of diametrically oppositely disposed gears which mesh with the input gears G1 and G2. When the speeds of rotation of the input gears are equal and opposite, no movement of the cage element occurs; however, should the speed of one gear be greater than that of the other, the cage element will rotate according to the differential of the speed of the two gears. Angular movements of the cage element are transmitted to the gyroscope G through the differential shaft DS to cause angular displacement thereof about the displacement axis. The function of the gyroscope regulator with this arrangement is in nowise changed. The gear G2 corresponds to the transmitter T2 of the electrical synchrotie, the gear G1 corresponds to the transmitter T1, and the cage element corresponds to the differential receiver DR. The quantities dealt with in this arrangement differ only from those in the electrical differential in the sense that they are mechanical rather than electrical. In this embodiment of the invention, the generator MG which energizes the motor FM is driven at a constant speed by any suitable means (not illustrated). It is provided with a main field winding GMF which is energized according to the electrical output of a small pilot generator PG which is driven according to the speed of operation of the feed motor FM and thus according to the feeding speed of the cutting tool of the boring mill. The regulating field winding GRF of the main generator is energized again according to the electrical unbalance of the bridge circuit controlled by the gyroscope regulator. Since the generator speed in this application is at some constant speed and its main excitation varies substantially according to the speed of the feed motor, its electrical output will be roughly proportional to the speed of the feed motor. Here also the function of the gyroscope regulator is to supply only the regulating current for the field winding GRF necessary to maintain the speed of the feed motor at a selected percentage value of the speed of the table motor.

In each previous embodiment of the invention illustrated in the drawings, the flexible conductors are shown in the neutral position as being completely disengaged. In some instances, it will be found desirable to maintain two and possibly three of the flexible conductors for each resistor R1 and R2 in such a position that their contact members are closed to shunt portions of these resistors. With such an arrangement, when the prod P actuated by movements of the gyroscope G, deflects the flexible conductors on one side thereof in a direction to close most of the contact members, the flexible conductors on the opposite side of the prod will move to positions in which their contact members are disengaged. This results in a "push-pull" operation of the resistors increasing the resistance of one resistor element while decreasing the resistance of the other resistor element, to double the unbalance of the bridge circuit over that obtained in the arrangements before disclosed for given movements of the prod. Such an arrangement is shown in Fig. 6.

The foregoing disclosure and the showings made in the drawings are merely illustrative of the principles of this invention and are not to be interpreted in a limiting sense, the only limitations are to be determined from the scope of the appended claims.

We claim as our invention:

1. In a machine tool drive, the combination, of a driving element for controlling the operation of a work piece element, a driving element for controlling the operation of a cutting tool element, first means operated in accordance with the work piece element, second means operated in accordance with the machine tool element, manually operated control means for varying the operation of one of said first and second means independently of its associated machine tool element, a precessing element, means responsive to the differential of movements of the first means and the second means for actuating the precessing element, and means responsive to movements of the precessing element for controlling one of said driving elements.

2. In a machine tool drive, the combination of, a work piece element, a driving element for operating the work piece element, a cutting tool element, a driving element for operating the cutting tool element, first means driven in accordance with movements of the work piece element, second means driven in accordance with movements of the cutting tool element, manually operated control means for changing the ratio of the drive of one of said first means and said second means, a precessing element, means responsive to the differential of movements of the first and second means for actuating the precessing element, and means responsive to movements of the precessing element for controlling the operation of one of the driving elements.

3. In a boring mill, the combination of, a table for mounting a work piece, a tool saddle for mounting a cutting tool, mechanism for operating the tool saddle, a first motor for driving the table, a second motor for driving the tool saddle, first means driven according to the movements of the table, second means driven according to movements of the tool saddle, means for varying the speed of operation of the table, manually operated control means for varying the ratio of the drive of one of said first and second means, a precessing element, means responsive to the differential of movements of the first and second means for actuating the precessing element, and means responsive to movements of the precessing element for controlling the operation of one of the driving elements.

4. In a boring mill drive having a rotatable table and a movable tool saddle, the combination of, a motor for driving the table, a motor for driving the tool saddle, first means driven according to the movements of the table, second means driven according to the movements of the tool saddle, means for varying the speed of operation of the table, manually operated control means for varying the ratio of the drive of one of the first and second means, a gyroscope, means responsive to the differential of the movements of the first and second means for actuating the hyroscope, that is, angularly displacing the gyroscope to cause precessional movement thereof, a regulator including a resistor element and a plurality of flexible conductors connected along spaced taps thereof, said flexible conductors carrying contact elements at their free extremities which progressively close upon deflection thereof, means connected to said gyroscope for deflecting the flexible conductors, and means for energizing one of said motors depending upon the value of the electrical resistance of said resistor element.

5. In a drive for a machine tool having a work piece element and a cutting tool element, the combination of, a first motor for driving the work piece element, a second motor for driving the cutting tool element, first means driven according to the speed of operation of the work piece element, second means driven according to the speed of operation of the cutting tool element, means for varying the speed of operation of the work piece element, manually adjustable control means for varying the ratio of the drive of one of the first and second means, a gyroscope having three axes of movement, one a spin axis, one a displacement axis, and the last a precession axis, means responsive to the differential of movements of the first and second means for angularly displacing said gyroscope about said displacement axis, thereby causing said gyroscope to precess according to the rate of change of angular movement thereof about said displacement axis, a regulator having a resistor element and a plurality of flexible conductors connected along spaced taps thereof, said flexible conductors carrying at their free extremities contact elements which progressively close upon deflection of the flexible conductors, means connected to said gyroscope to be moved according to movements of the gyroscope about the displacement and precession axes for deflecting said flexible conductors, and means for energizing one of said motors depending upon the value of the electrical resistance of said resistor element.

6. In a drive for a machine tool having a work piece element and a cutting tool element, the combination of, a motor for driving the work piece element, a motor for driving the cutting tool element, a first electrical transmitting element driven by the work piece element and having an electrical output depending upon movements of the work piece element, a second electrical transmitting element driven by the cutting tool element and having an electrical output depending upon movements of the cutting tool element, means for varying the speed of the work piece element, manually adjustable control means for varying the ratio of the drive of one of said electrical transmitting elements, a gyroscope mounted for displacement about one axis thereof and for precession about a second axis thereof, an electrical differential receiver energized according to the electrical output of both said electrical transmitters which angularly moves according to the differential of said electrical outputs for displacing said gyroscope about said displacement axis, whereby said gyroscope precesses about said precession axis, a regulator including a resistor element and a plurality of flexible conductors connected at one extremity along spaced taps of said resistor element, said flexible conductors at their free extremities carrying contact elements which progressively close upon deflection of the flexible conductors, means secured to said gyroscope to be moved according to movements of the gyroscope about the displacement and precession axes thereof for deflecting said flexible conductors, and means for energizing one of said motors depending upon the electrical resistance value of the resistor element.

7. In a drive for a machine tool having a work piece element and a cutting tool element, the combination of, a motor for driving the work piece element, a motor for driving the cutting tool element, a first electrical transmitting element driven by the work piece element and having an electrical output depending upon movements of the work piece element, a second electrical transmitting element driven by the cutting tool element and having an electrical output depending upon movements of the cutting tool element, means for varying the speed of the work piece element, manually adjustable control means for varying the ratio of the drive of one of said electrical transmitting elements, a gyroscope mounted for displacement about one axis thereof and for precession about a second axis thereof, an electrical differential receiver energized according to the electrical output of both said electrical transmitters which angularly moves according to the differential of said electrical outputs for displacing said gyroscope about said displacement axis whereby said gyroscope precesses about said precession axis, a regulator including a resistor element and a plurality of flexible conductors connected at one extremity along spaced taps of said resistor element, said flexible conductors at their free extremities carrying contact elements which progressively close upon deflection of the flexible conductors, means secured to said gyroscope to be moved according to movements of the gyroscope about the displacement and precession axes thereof for deflecting said flexible conductors, a generator for energizing one of said motors, field winding means for said generator, and means for energizing said field winding means depending upon the value of the electrical resistance of said resistor element.

8. In a drive for a machine tool having a work piece element and a cutting tool element, the combination of, a motor for driving the work piece element, a motor for driving the cutting tool element, a first electrical transmitting element driven by the work piece element and having an electrical output depending upon movements of the work piece element, a second electrical transmitting element driven by the cutting tool element and having an electrical output depending upon movements of the cutting tool element, means for varying the speed of the work piece element, manually adjustable control means for varying the ratio of the drive of one of said electrical transmitting elements, a gyroscope mounted for displacement about one axis thereof and for precession about a second axis thereof, an electrical differential receiver energized according to the electrical output of both said electrical transmitters which angularly moves according to the differential of said electrical outputs for displacing said gyroscope about said displacement axis whereby said gyroscope precesses about said precession axis, a regulator including a pair of resistor elements and a plurality of flexible conducting elements connected at one extremity along spaced taps of each of said resistor elements, said flexible conductors carrying at their free extremities contact elements which upon deflection of said conducting elements progressively close to shunt the tapped sections of the resistor element, an electrical bridge circuit, said resistor elements being connected in adjacent legs of said bridge circuit, means connected to said gyroscope for alternately deflecting the flexible conductors of said resistor elements depending upon the direction of displacement and precessional movements of the gyroscope, a generator for energizing one of said motors, field winding means for the generator, and means for energizing said field winding means depending upon the electrical unbalance of said electrical bridge circuit.

9. In a drive for a machine tool having a work piece element and a cutting tool element, the combination of, first driving means for operating the work piece element, second driving means for operating the cutting tool element, means forming a part of the first driving means for varying the speed of operation of the work piece element, means for producing a quantity indicative of the speed of operation and position of the work piece element, means for producing a similar quantity indicative of the speed of operation and position of the cutting tool element, manually adjustable control means for varying one of said quantities independently of the operating characteristics of its associated machine tool element, a precessing element, means for actuating said precessing element according to the differential of said quantities to effect precessional movement thereof, a generator for energizing one of said driving means, field winding means for said generator, an electrical bridge circuit, a regulator including a pair of resistance elements connected in adjacent legs of said bridge circuit, portions of said field winding means being connected in the remaining adjacent legs of said bridge circuit, further resistance means forming a part of the bridge circuit for balancing and unbalancing the bridge circuit, means responsive to movements of said precessing element for alternately changing the resistance values of said pair of resistance elements, a motor for controlling said further resistance means, said motor being energized upon substantial extremes of movement of said precessing element by said means responsive to movements of said precessing element.

10. In a drive for a machine tool having a work piece element and a cutting tool element, the combination of, first driving means for operating the work piece element, second driving means for operating the cutting tool element, means forming a part of the first driving means for varying the speed of operation of the work piece element, means for producing a quantity indicative of the speed of operation and position of the work piece element, means for producing a similar quantity indicative of the speed of operation and position of the cutting tool element, means for varying one of said quantities independently of the operating characteristics of its associated machine tool element, an electrical bridge circuit, means for controlling the electrical characteristics of said bridge circuit depending upon the difference of said quantities and the rate of change of the difference of said quantities over a range of differential values of the quantities from zero to a predetermined differential value, means responsive to the difference of said quantities above said predetermined differential value for additionally controlling the electrical characteristics of said bridge circuit beyond said predetermined value, and means responsive to the electrical characteristics of said bridge circuit for controlling one of said driving means.

11. In a drive for a machine tool having a work piece element and a cutting tool element, the combination of, a motor for the work piece element, a motor for the cutting tool element, a generator driven according to the speed of operation of the work piece element, means electrically connecting said generator to energize the motor for the cutting tool element, means for producing an electrical quantity depending upon the movements of the work piece element, means for producing an electrical quantity depending upon the movements of the cutting tool element, means for producing a control electrical quantity depending upon the rate of change of the differential of said quantities, means for utilizing said last-mentioned control quantity for regulating the excitation of said generator, means for separately exciting said generator, and means for simultaneously changing the separate excitation of said generator and changing one of said electrical quantities independently of the associated machine tool element.

12. In a drive for a machine tool having a work piece element and a cutting tool element, the combination of, a first motor for driving the work piece element, a second motor for driving the cutting tool element, first means driven according to the speed of operation of the work piece element, second means driven according to the speed of operation of the cutting tool element, means for varying the speed of operation of the work piece element, manually adjustable control means for varying the ratio of the drive of one of the first and second means, a gyroscope having three axes of movement, one a spin axis, one a displacement axis, and the last a precession axis, means responsive to the differential of movements of the first and second means for angularly displacing said gyroscope about said displacement axis, thereby causing said gyroscope to precess according to the rate of change of angular movement thereof about said displacement axis, a regulator having a resistor element and a plurality of flexible conductors connected along spaced taps thereof, said flexible conductors carrying at their free extremities contact elements which progressively close upon deflection of the flexible conductors, means connected to said gyroscope to be moved according to movements of the gyroscope about the displacement and precession axes for deflecting said flexible conductors, a field winding for said second motor, means for exciting the field winding for the second motor, a generator for energizing the second motor, a field winding for the generator, means for energizing the generator field winding in dependence of the value of the electrical resistance of said resistor element, and means for increasing the excitation of said generator field winding and decreasing the excitation of said field winding of said second motor independently of the operation of said regulator.

GEORGE E. KING.
NELSON D. COOPER.
GLENN A. CALDWELL.

REFERENCES CITED

The following references are of record in the file of this patent:

UNITED STATES PATENTS

| Number | Name | Date |
| --- | --- | --- |
| 2,345,116 | Hanna | Mar. 28, 1944 |
| 2,385,203 | Hanna et al. | Sept. 18, 1945 |
| 2,385,204 | Hanna | Sept. 18, 1945 |

FOREIGN PATENTS

| Number | Country | Date |
| --- | --- | --- |
| 702,932 | France | Feb. 2, 1931 |